US008320874B2

United States Patent
Mills et al.

(10) Patent No.: US 8,320,874 B2
(45) Date of Patent: *Nov. 27, 2012

(54) SYSTEM AND METHOD FOR ESTABLISHING AN INCIDENT COMMUNICATIONS NETWORK

(75) Inventors: Donald C. Mills, Bedford, NH (US); Joseph Boucher, Chelmsford, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,794

(22) Filed: Jan. 4, 2010

(65) Prior Publication Data

US 2010/0261427 A1    Oct. 14, 2010

Related U.S. Application Data

(63) Continuation of application No. 11/488,409, filed on Jul. 18, 2006, now Pat. No. 7,643,445.

(60) Provisional application No. 60/595,578, filed on Jul. 18, 2005.

(51) Int. Cl.
    *H04M 11/04* (2006.01)
(52) U.S. Cl. ............... 455/404.1; 455/455; 455/516; 455/518; 455/521; 370/328; 370/338; 370/340; 370/352; 379/37
(58) Field of Classification Search .......... 455/516–521, 455/450, 455, 422.1, 424–425, 428, 560–561, 455/550.1, 556.1–556.2, 566, 445; 370/276–278, 370/310, 310.2, 328–330, 338, 340–341, 370/395.52
See application file for complete search history.

(56) References Cited

U.S. PATENT DOCUMENTS

| 7,035,773 | B2  |    4/2006 | Keyes, IV et al. |
| 7,076,249 | B2* |    7/2006 | Svedevall et al. ............. 455/436 |
| 7,453,837 | B2  |   11/2008 | Jiang et al. |
| 7,643,445 | B2* |    1/2010 | Mills et al. .................... 370/328 |
| 2002/0102999 | A1 |   8/2002 | Maggenti et al. |
| 2004/0125802 | A1* |   7/2004 | Lillie et al. .................. 370/390 |
| 2005/0079853 | A1 |   4/2005 | Hurtta |
| 2005/0170808 | A1 |   8/2005 | Hamilton |

(Continued)

OTHER PUBLICATIONS

International Search Report and the Written Opinion of the International Searching Authority directed to related International Patent Application No. PCT/US2012/026062, mailed May 24, 2012, from the European Patent Office; 9 pages.

*Primary Examiner* — Anthony Addy
*Assistant Examiner* — Shahriar Behnamian
(74) *Attorney, Agent, or Firm* — Sterne, Kessler, Goldstein & Fox, PLLC

(57) ABSTRACT

The present invention is directed to a system and method for providing an interoperable communications system including a plurality of otherwise disjunct communication systems each including at least one communications device. The system includes a plurality of system interface controllers each coupled to one of the communication systems and a common network for connecting the communication system and associated communications devices to the common network. A controller is coupled to each of the system interface controllers. The system interface controller being operable in response to commands from an authorized controller wherein the connection between each of the communication systems and the common network is controlled by a controller associated with, and authorized to control each communication system. The system provides an interoperable communications system between the otherwise disjunct systems wherein the communications devices for each system coupled to the common network are in communication therebetween.

29 Claims, 7 Drawing Sheets

U.S. PATENT DOCUMENTS

| | | |
|---|---|---|
| 2006/0023654 A1 | 2/2006 | Koren et al. |
| 2006/0046697 A1* | 3/2006 | Koren et al. ............... 455/412.2 |
| 2006/0052113 A1 | 3/2006 | Ophir et al. |
| 2006/0158329 A1 | 7/2006 | Burkley et al. |
| 2007/0010275 A1 | 1/2007 | Kiss |
| 2007/0060144 A1 | 3/2007 | Mills et al. |
| 2008/0144525 A1 | 6/2008 | Crockett et al. |
| 2010/0159976 A1 | 6/2010 | Marocchi et al. |
| 2012/0040635 A1 | 2/2012 | Boucher et al. |

* cited by examiner

SYSTEM AND METHOD FOR ESTABLISHING AN INCIDENT COMMUNICATIONS NETWORK

CROSS-REFERENCE TO RELATED APPLICATIONS

This application is a continuation of U.S. patent application Ser. No. 11/488,409, filed on Jul. 18, 2006, entitled "Interoperable Communications System and Method of Use," which is incorporated herein by reference.

The '409 Application in turn claims priority to U.S. Provisional Patent Application No. 60/595,578, filed on Jul. 18, 2005, entitled "Selective Interoperability In A Communications Network," which is incorporated herein by reference.

BACKGROUND OF THE INVENTION

1. Field of the Invention

The present invention generally relates to a communications system for use by multiple agencies during an emergency or other incident, and more particularly, to an interoperable communications system for coupling separate radio networks to a common network wherein the connection for each radio network with the common network is separately controlled by a controller associated with each radio network.

2. Background of the Invention

Private wireless communication networks, such as those used by public safety or commercial users, are typically isolated from one another and often utilize different and incompatible technologies. While interoperability products are available to interconnect such diverse systems, cooperation among the entities involved is often a barrier to full implementation. Thus, prior art first responder communication systems exist wherein control of the resources of each organization coupled to the system is controlled by a central commander or controller. Each organization providing resources to the system must relinquish control of its resources to the central commander. The organization responsible for the operation of its radio system(s) may be unable or unwilling to grant control of its resources either to peer organizations or to a higher-level organization.

Additionally, primitive "party-line" interconnect systems have been implemented, but users have control of only resources physically at their location, and have no visibility to what resources other users may have interconnected.

Based on the foregoing, it is the general object of the present invention to provide an interoperable communications system that improves upon, or overcomes the problems and drawbacks associated with prior art communication systems.

BRIEF SUMMARY OF THE INVENTION

The present invention provides an interoperable communications system including a plurality of separate communication systems each including at least one communications device, a plurality of system interface controllers each coupled to one of the communication systems and a common network for connecting an associated communication system and associated communications devices associated to the common network. The system further includes a plurality of controllers each coupled to one of the system interface controllers and the common network, each of the system interface controllers being operable in response to commands from the controller coupled thereto for connecting the communication system and the associated communication devices to the common network for transmitting and/or receiving messages transmitted over said common network. The connection between each of the communications systems and the common network being controlled by said controller associated with each of the communications systems. The plurality of communication systems being interconnected via the common network forming the interoperable communications system wherein the communications devices associated with each of the communication systems are operable by users of the other communication systems.

The present invention facilitates real-time interoperability among communications systems while retaining within each organization control of its own resources (e.g., radio channels or talkgroups). The present invention addresses communications during an "incident" which may be a minor event or a major disaster response. Resources may include, but are not limited to: dispatchers, radio channels, radio talkgroups, individual radio users, telephone resources, and data resources such as database access. A convenient means is provided for staff of each organization to connect and disconnect its resources to an "incident." These functions will commonly be performed by dispatch personnel. Each participant organization in an incident has a view of all resources that have been assigned. Control of each resource is assigned to specific organizations and/or individuals; only those organizations or individuals can assign that resource to an incident.

Additionally, the present invention provides a method of interconnecting a plurality of discrete communication systems and associated communications devices via a common network. The method including enabling a plurality of users associated with each of a plurality of communications system to control to the communications devices associated with each of the other communications systems.

The method includes establishing control privileges for connecting each of the communications systems to the common network and permitting only those users with the control privileges to control interconnection of each of the communications system to the common network. Additionally, the method includes coupling each of the communications systems to the common network in response to commands from one of the users having the control privileges for the communications system thereby interconnecting thereby communications devices associated with said coupled communications system to said common network.

In a preferred embodiment, the present invention provides a system for connecting a plurality of discrete radio networks to a common network. The system includes a radio interface controller coupled to a radio interface for each of the communications systems and a controller coupled to the radio interface controller for control thereof. Each of the radio interface controller and the controller being coupled to the common network. The radio interface controller being operable in response to commands from the controller wherein control of the interconnection of each radio network is controlled by a controller associated therewith.

The radio interface controller being connectable to various radio networks of different types and utilizing different frequencies wherein the present invention system provides for communication between otherwise non-compatible communications networks and devices.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
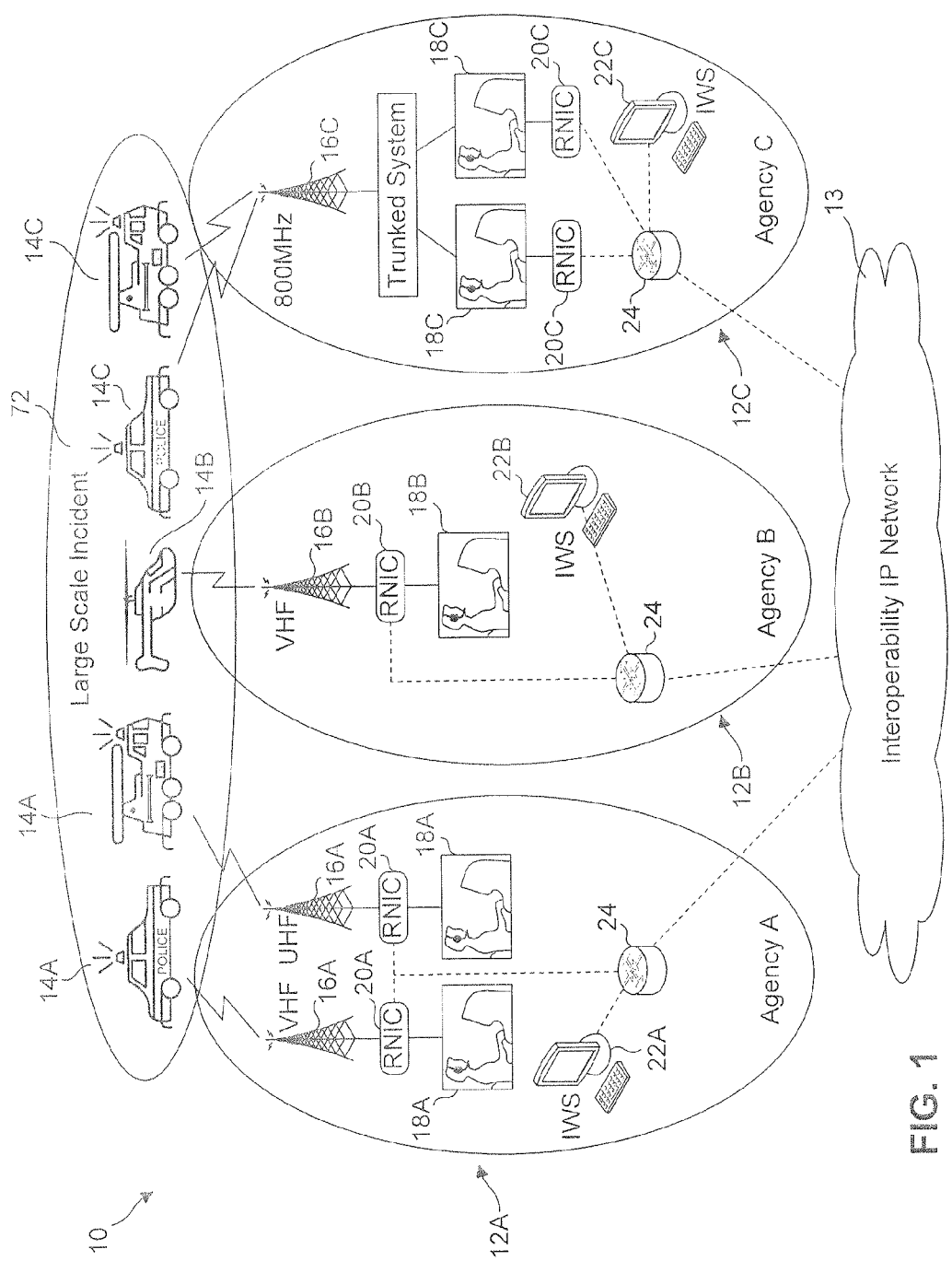
FIG. 1 is a block diagram showing an overview of one embodiment of an interoperable communications network in accordance the present invention.

As shown in FIG. 1, the present invention is directed to an interoperable communications system, hereinafter referred to as "Interop System" generally referred to by the reference numeral 10, which provides for communication between a plurality of separate radio networks 12. In the FIG. 1 embodiment, the Interop System 10 includes the separate radio networks 12A, 12B and 12C each coupled to a common network 13 referred to as an Interoperability IP Network or hereinafter as the "Interop Network". Each radio network 12A-12C includes corresponding communication devices 14A-14C respectively, which include mobile communication devices 14A-14C mounted in various vehicles. Although not shown, hand-held or other types of portable communications devices 14 are also often utilized in the radio networks 12. As described following, users of the communication devices 14A-14C of each radio network 12A-12C respectively can communicate to all other users of each of the radio networks 12A-12C via the Interop Network 13 in accordance with the present invention.

Each of the radio networks 12A-12C also include typical antennas 16A-16C and base consoles 18A-18C. The radio networks 12A-12C represent typical radio networks utilizing one of various communications channels including Very High Frequency (VHF), and Ultra High Frequency (UHF), among others, which are coupled together forming the Interop System 10 in accordance with the present invention. For example, FIG. 1 includes diagrams of various typical radio networks 12 including a two-channel system 12A, a single channel system 12B, and a trunked system 12C which are each coupled to the Interop Network 13 and together form the Interop System 10 in accordance with the present invention.

Still referring to FIG. 1, the Interop System 10 includes at least one radio network interface controller 20A-20C (herein referred to as "RNIC") coupled to each of the radio networks 12A-12C respectively. Each RNIC 20A-20C is coupled to the corresponding radio network 12 as well as the common Interop Network 13 and a controller 22 identified herein as an Interoperability Work Station (IWS). Each RNIC 20 is operable in response to commands from one or more IWS controllers 22 designated as having control over the particular RNIC 20 for coupling an associated radio network 12 to the Interop Network 13 for the purpose of transmitting and receiving messages to/from each of the other radio networks coupled to the Interop Network. The two-channel radio network 12A includes two interfaces RNIC 20A one for coupling each channel of the two-channel radio network to the Interop Network 13. Still referring to the radio network 12A, each of the two RNIC 20A interfaces are coupled to and controlled by a single IWS controller 22. However, in other embodiments of the present invention, other configurations may be utilized including wherein a single RNIC 20 is configured to connect both channels of a two-channel network to the Interop Network 13 or wherein each RNIC 20A is coupled to controllable by individual IWS controllers 22.

Still referring to FIG. 1, the Interop System 10 includes a router 24 coupled between the Interop Network 13 and the RNICS 20 and IWS controllers 22 for each radio network 12 for routing messages transmitted therebetween via the Interop Network 13. Alternatively, in other embodiments of the Interop System 10, other types of data switches or hubs may also be utilized instead of the data router 24.

In a preferred embodiment, the Interop System 10 transmits messages between the multiple radio networks 12 via IP protocol over the Interop Network 13, however, the scope of the present invention is not limited in this regard as any suitable transmission protocols and corresponding network could be utilized.

Figure 2:
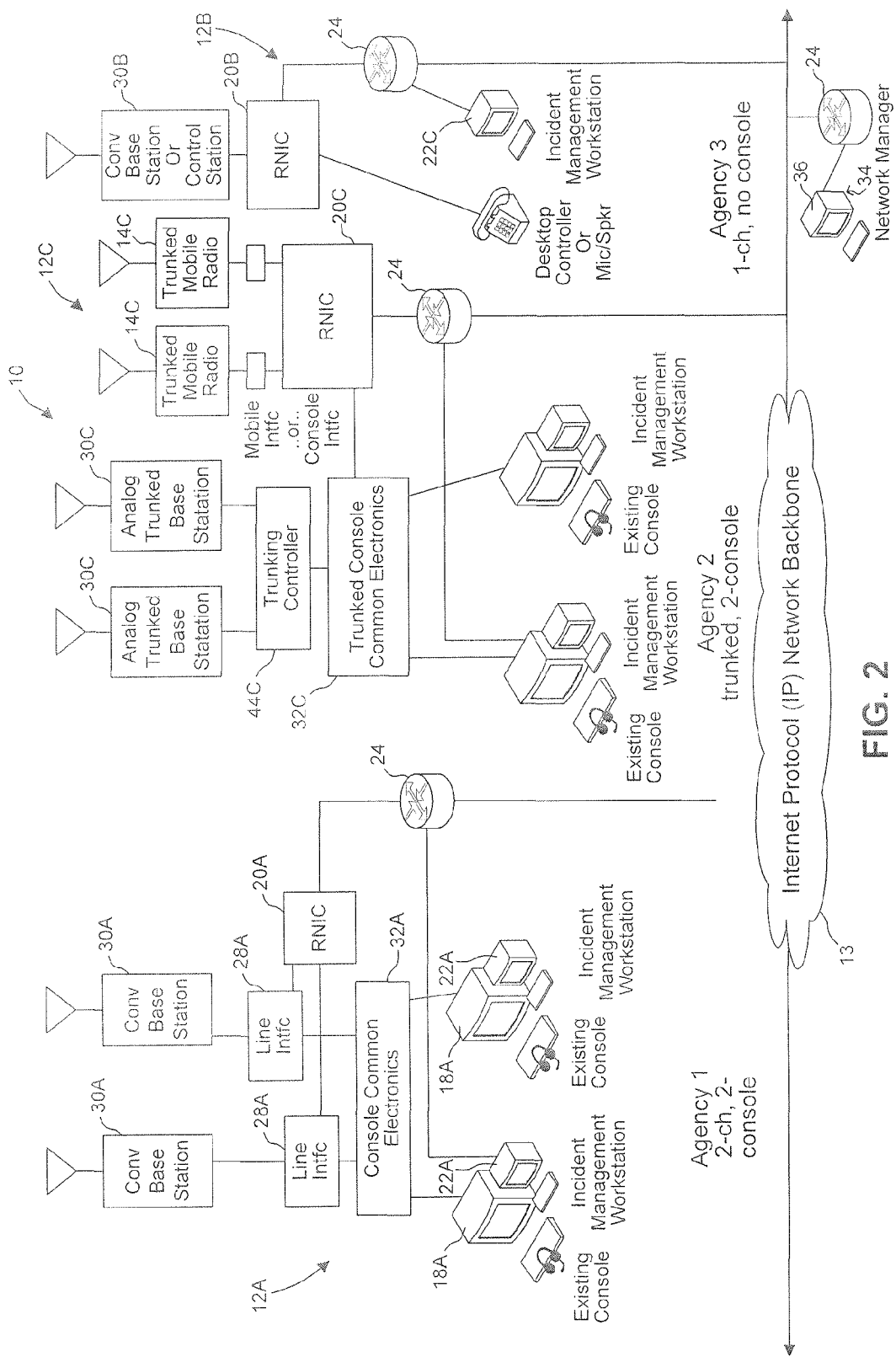
FIG. 2 is a block diagram showing another embodiment of an interoperable communications network in accordance with the present invention.

Preferably, the present invention Interop System 10 is configured as overlay architecture connectable to pre-existing radio networks 12A-12C as shown in FIG. 2. Typically, an RNIC 20 and IWS controller 22 is coupled to each existing radio network 12A-12C for connecting each radio network to the common Interop Network 13. In this embodiment, the existing radio networks 12A-12C are usually left in place for normal operation apart from the Interop System 10. Depending on the radio network 12 being coupled to the Interop Network 13, various types of line interfaces 28 are utilized for coupling the RNIC 20 to the particular radio network.

As shown in FIG. 2, the radio network 12A includes conventional base stations 30 or repeaters connected to base consoles 18A via conventional console electronics 32A. A line interface 28A is provided for coupling the RNIC 20A to the radio network 12A. Depending on the configuration of the radio network 12, the line interface 28 may include various known interfaces such as, local control interfaces (audio, push-to-talk (PTT), receiving indication), DC remote, tone remote, and ear and mouth (E & M) interfaces.

Alternatively, the RNIC 20C is connected to a trunked radio network 12C via an air interface 40C coupled to mobile radios 42C. In another embodiment, also illustrated in FIG. 2, the RNIC 20C can be coupled to the radio network 12C via typical console electronics 32C and trunking controller 44C.

Still referring to FIG. 2, the radio network 12B is coupled to the Interop Network 13 via the RNIC 20B coupled in-line in the existing radio network. Thus, the communications devices 14B are provided selective access to the Interop Network 13 via the RNIC 20B pursuant to commands from the IWS controller 22B associated with the radio network 12B or another authorized IWS controller 22.

Referring again to FIG. 2, a network administrator or manager 34 including a network server 36 is coupled to the Interop Network 13 for carrying out administrative duties related to the Interop Network. Alternatively, in other embodiments of the Interop System 10, configuration of the network can be implemented from endpoints such as the IWS controllers 22 and RNIC 20 servers wherein a network administrative server is not required.

Figure 3:
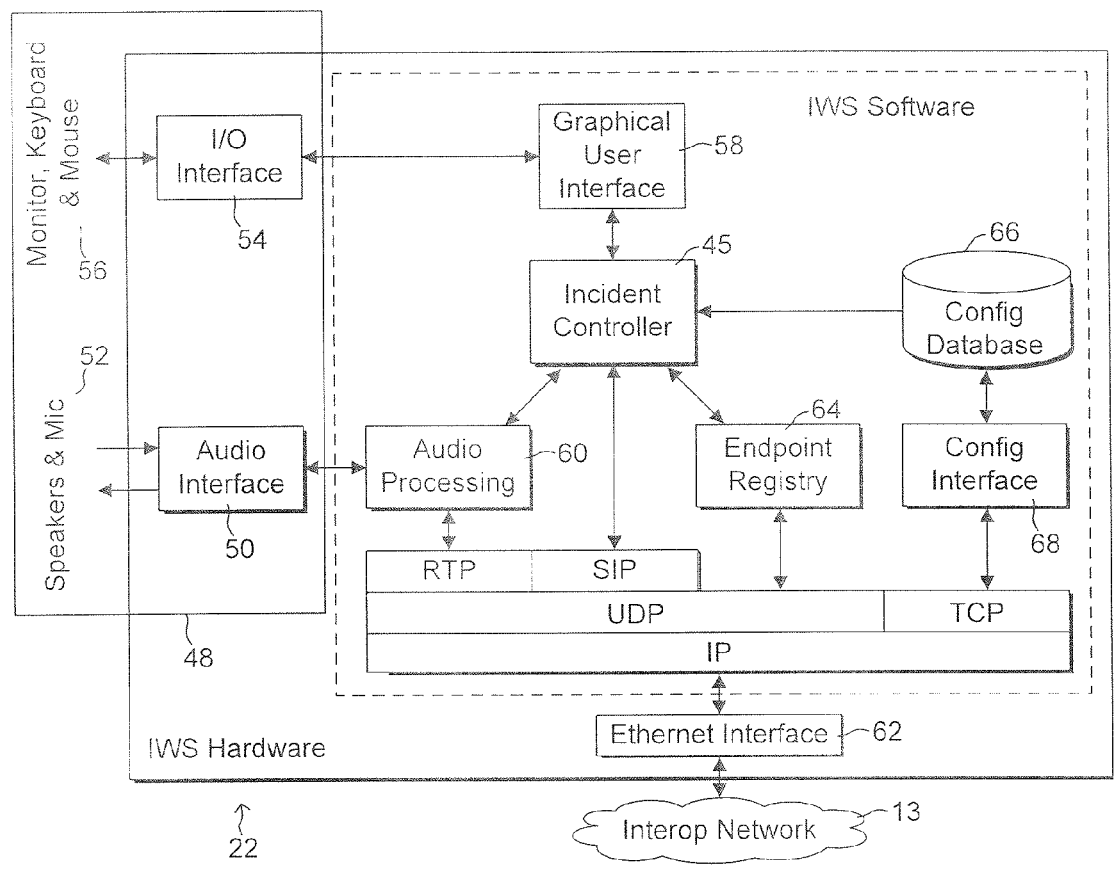
FIG. 3 is a block diagram of one embodiment of an Interoperability Workstation (IWS) controller in accordance with the present invention.

Referring now to FIGS. 1 and 3, each IWS controller 22 is coupled to the Interop Network 13 and the RNIC 20 for controlling the connection between the associated radio network 12 and the Interop Network 13. Thus, the connection between each radio network 12 and the Interop Network 13 is controlled by the IWS controller 22 associated with each radio network via the RNIC 20. This is a key feature of the present invention as control over each radio network 12 and the communication devices 14 associated therewith is maintained by an IWS controller 22 coupled thereto. As set shown in FIG. 3, the IWS controller 22 includes a computer processor identified as incident controller 45 having a user interface 48 including one or more of an audio interface 50 including a speaker and microphone 52 and an I/O interface 54 including a keyboard, mouse, monitor, joystick, etc., collectively, identified by the reference numeral 56. A graphical user interface (GUI) 58 is provided coupled to the I/O interface 54 for providing graphics based outputs to a user of the IWS controller 22 such as the GUI included in FIG. 6.

The IWS controller 22 includes an audio processor 60 coupled to the incident controller 45 and the audio interface 50 for processing audio inputs/outputs transmitted to and from the IWS controller respectively. The audio processor 60 converts data packets received by the IWS controller 22 to audio signals and outputs the same to a user of the IWS controller via the audio interface 50. Similarly, audio signals input to the IWS controller are converted by the audio processor 60 and/or the incident controller 45 and transmitted to the appropriate recipient via a network interface 62 and the Interop Network 13. In the preferred embodiment, audio signals are transmitted over the Interop Network 13 using standard RTP or SRTP as appropriate for real time transmission of audio messages, however other protocols may be utilized.

The IWS controller 22 includes an endpoint registry 64 coupled to the incident controller 45 and the network interface 62 for storing address information for all endpoints in the Interop System 10 including all RNIC 20 servers and all IWS controllers 22. Each endpoint in the Interop Network 13 periodically announces its presence to all other endpoints in the Interop Network (the preferred embodiment uses IP multicast to perform this announcement). All other endpoints that receive this announcement add the originating endpoint to their endpoint registry 64. The endpoint registry 64 allows each endpoint to communicate directly with any other endpoint in the Interop Network 13 without the need for an intervening server.

The IWS controller 22 also includes a configuration database 66 and configuration interface 68 coupled to the incident server and the Interop Network 13. The configuration database 66 is provided for storing configuration data for the IWS controller 22 as well as other IWS controllers 22 and RNIC 20 servers including public key information for each RNIC 20 and IWS controller 22 in the Interop System 10. A preferred embodiment of the Interop System 10 utilizes a public key cryptography method for encrypting messages transferred over the Interop Network 13.

Each RNIC 20 is configured with a list of IWS controllers 22 that have permission to control the operation of that RNIC which are stored in the configuration database 66 coupled to the RNIC. For security purposes, each RNIC 20 verifies that a received message is from one a trusted IWS controller 22.

For message authentication, the preferred embodiment of the Interop System 10 uses public-key cryptography as follows: Each endpoint in the system (RNIC 20 or IWS controller 22) is assigned a private key and a public key in accordance with standard key generation techniques. The private key is stored only on the endpoint associated therewith. The public key is distributed to all other endpoints in the network via the configuration interface 68. Messages from an endpoint to other endpoints are encrypted using the originating endpoint's private key. Messages received by an endpoint are decoded using the originating endpoint's public key. If this decode process is successful, the message originator and contents are securely authenticated.

The Interop System 10 provides for multiple authorized IWS controllers 22 to control a particular RNIC 20 and thereby control connection between the associated communications devices 14 and the Interop Network 13. Typically, for use during incidences involving multiple municipalities or jurisdictions, or other events, resources including radio networks 12 and the associated communication devices 14 may be shared by multiple organizations including wherein several or all of the organizations may be permitted to exercise control over the shared resources. The Interop System 10 provides for multiple organizations to control shared radio networks 12 by designating each of the IWS controller 22 for each of the multiple organizations as authorized to control the RNIC 20 associated with the shared network. Thus, the RNIC 20 is configured to include all authorized IWS controllers 22 as authorized to provide instructions to the RNIC. Although the commands are sent to the RNIC 20 as session invitations, the RNIC is configured to accept all invitations from authorized IWS controllers 22.

Figure 4:
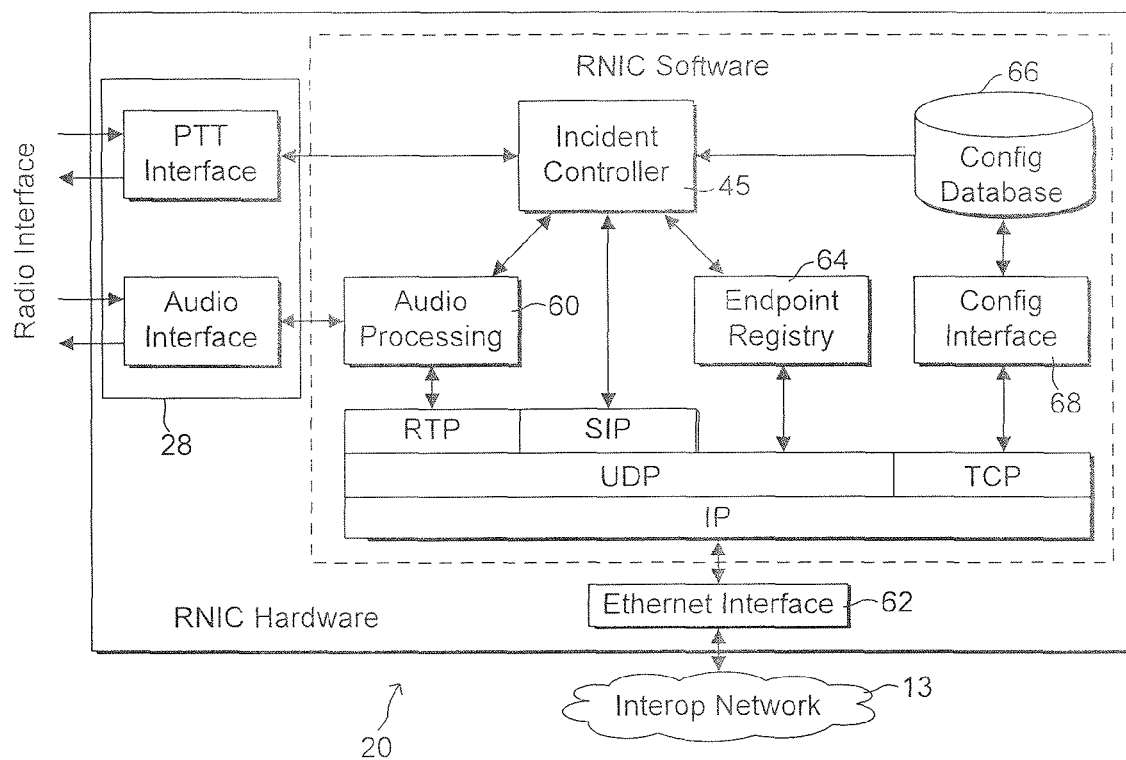
FIG. 4 is a block diagram of one embodiment of a Radio Network Interface Controller (RNIC) in accordance with the present invention.

Referring to FIG. 4, the RNIC 20 coupled to each radio network 12 includes an incident controller 45, coupled to an audio processor 60, an endpoint registry 64, a configuration database 66 and a configuration interface 68 as set forth above with respect to the IWS controller 22. The incident controller 45 is coupled to an associated radio network 12 via a radio interface 28 and the Interop Network 13 via a network interface 62.

Figure 5:
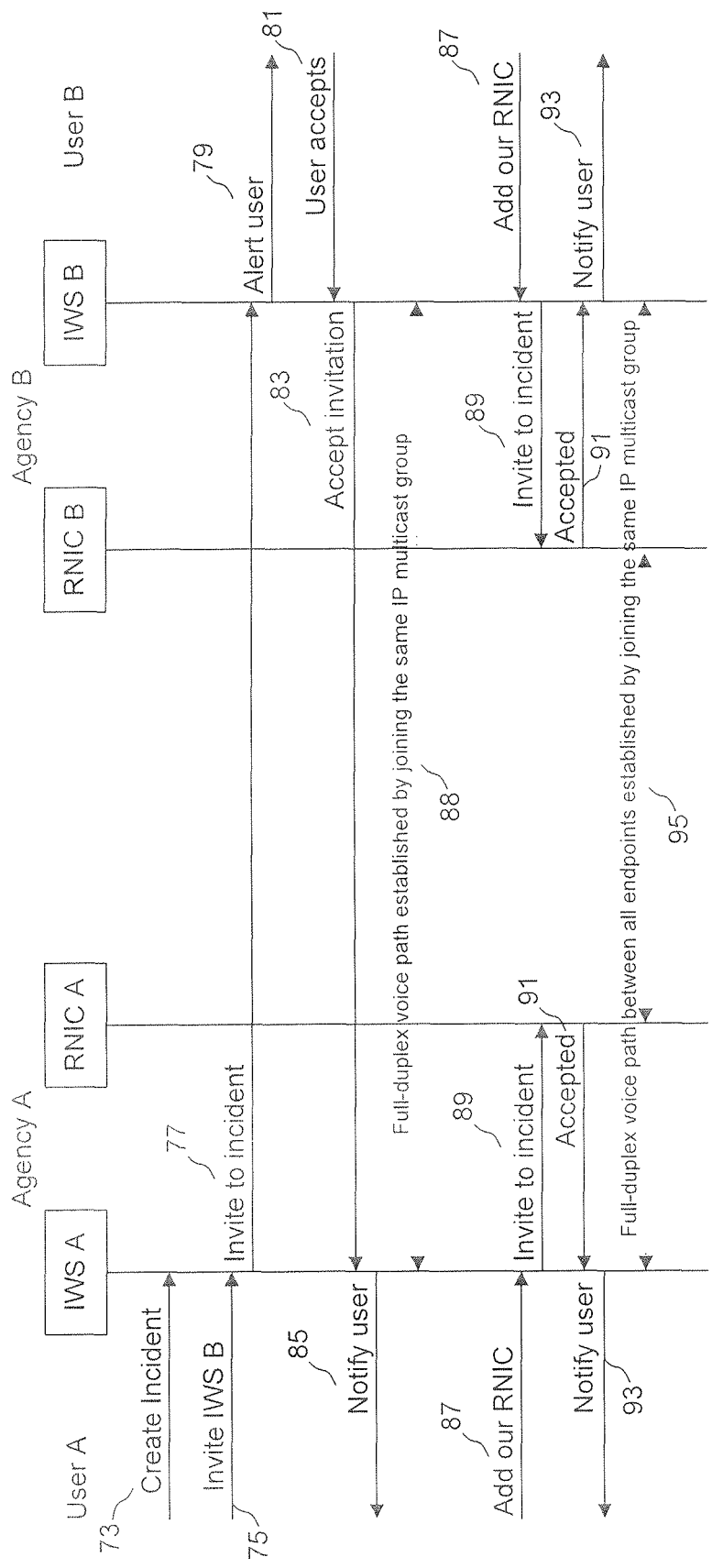
FIG. 5 is an event flow diagram showing the creation of an incident in accordance with the present invention interoperable communications network.
Figure 6:
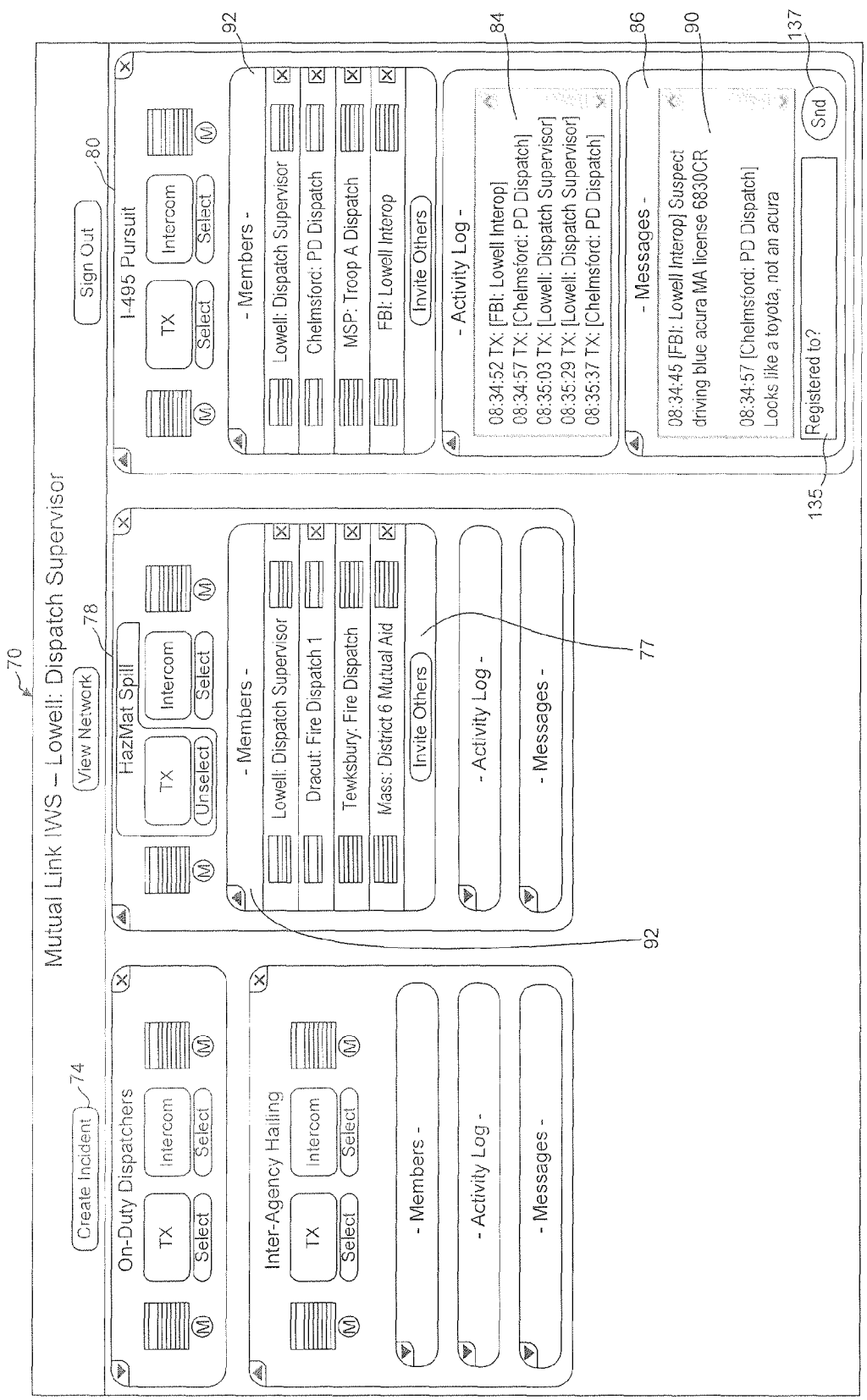
FIG. 6 is a diagram showing one embodiment of a graphical user interface (GUI) for use with an IWS of the present invention.
Figure 7:
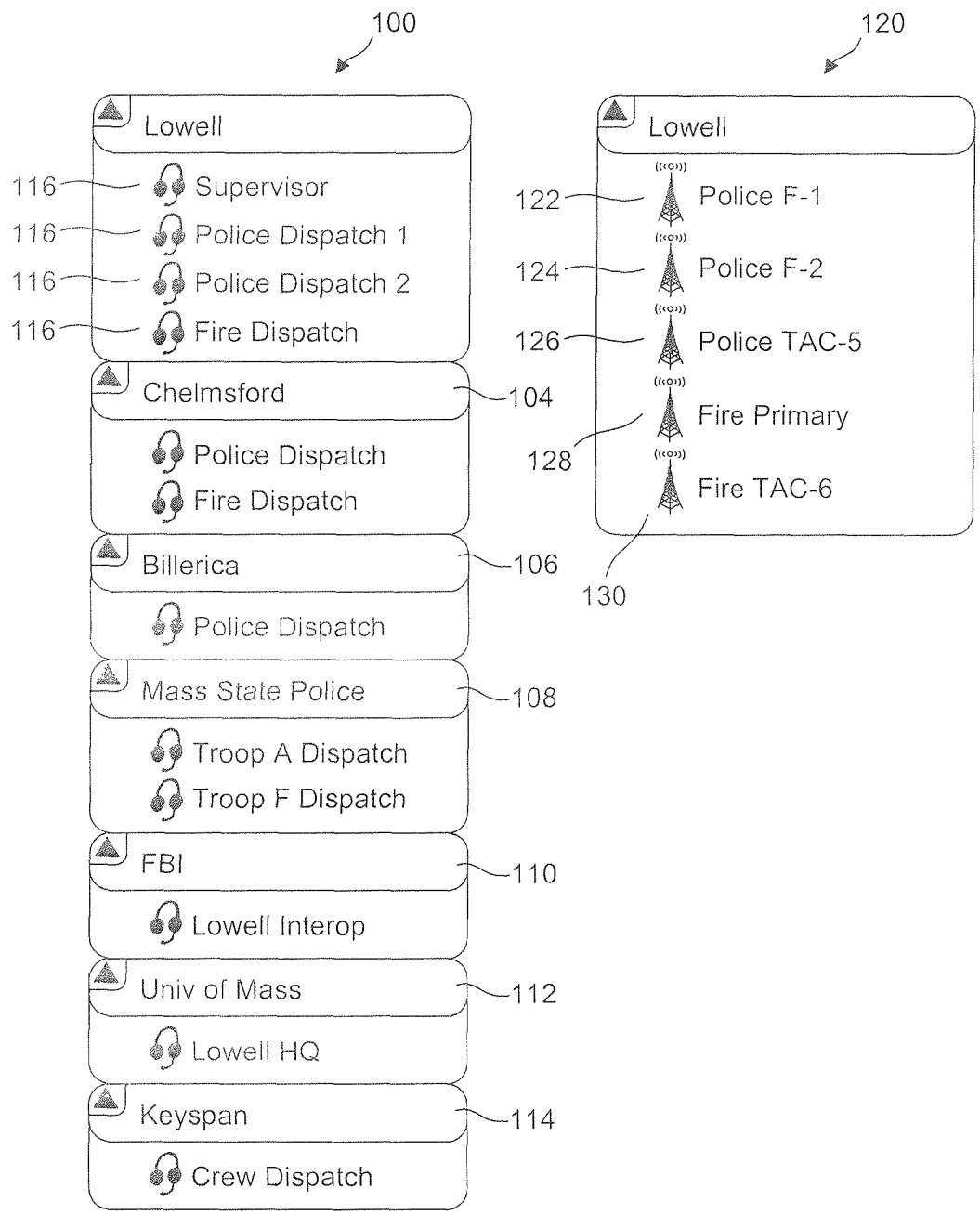
FIG. 7 is a diagram showing one embodiment of a GUI in accordance with the present invention for use with an IWS controller for contacting various other IWS controllers and networks within the system.

In operation, the IWS controller 22 creates an incident as set forth in the event flow diagram 70 of FIG. 5 and described following. An operator, User A, via an IWS controller 22 (IWS A) initiates a new incident 72 (FIG. 5, step 73) using the create incident button 74 of the GUI 76. (GUI 76 is illustrated in FIG. 6). The incident controller 45 assigns an IP address that will be used for voice communications for the incident 72 (the preferred embodiment uses an IP multicast address). If User A desires to talk to another IWS controller 22 (IWS B), he uses the GUI 76 via invitation button 77 associated with the incident 72 to select a particular IWS controller 22 to invite to participate in the incident 72 (FIG. 5, step 75). A GUI 100 (FIG. 7) is utilized by an IWS controller 22 for selection of another IWS controller to invite to an incident 72 or peer-to-peer talk group. In the FIG. 7 embodiment, each agency having IWS controllers 22 available on the Interop System 10 is identified on the GUI 100 (i.e., Lowell-102; Chelmsford-104; Billerica-106; Massachusetts State Police-108; FBI-110; University of Massachusetts-112; Keyspan-114.) The user of an IWS controller can select one or more IWS controllers 22 using the icons 116 identifying each IWS controller available. In this example, selecting the IWS B causes the incident controller 45 to look up and retrieve the address of IWS B in the endpoint registry 64. The incident controller 45 then sends an invitation to the particular IWS controller 22 selected using the Interop Network 13 (FIG. 5, step 77).

The incident controller on IWS B receives the invitation and provides a notification to the User B as to the invitation (FIG. 5, step 79). The User B may then accept or decline the invitation. Per the FIG. 5 example, User B accepts the invitation at step 81. Upon User B acceptance of the invitation, the incident controller 45 (of IWS B) sends an acceptance message to IWS A (FIG. 5, step 83) and the user thereof (User A) is alerted of the acceptance of User B at step 85.

Thereafter, the incident controllers 45 of both IWS A and IWS B direct their respective audio processors 60 to start a bidirectional audio stream as follows: Audio input from the IWS microphone 52 is converted to data packets (the preferred embodiment uses standard RTP or SRTP as appropriate) and is transmitted to the IP address assigned to the incident. This transmission may optionally be enabled by pressing a PTT (Push-To-Talk) button and disabled by the release of this button. Data packets received on the assigned IP address are converted to audio and sent to the IWS speakers 52. Thus, User A and User B are now engaged in a full-duplex voice conversation via their respective IWS controllers 22 (FIG. 5, event 88).

A preferred embodiment of the Interop System 10 uses the standard SIP protocol with message encryption to transmit messages over the Interop Network 13. However, the routing of information/data over the Interop Network 13 can be via any suitable protocol thus, the scope of the Interop System is not limited with respect to a particular data transmission protocol.

Still Referring to FIG. 5, following acceptance of an invitation to allocate its radio network 12 and associated communications devices 14, each IWS controller 22 must issue appropriate commands to the RNIC 20 coupled to the designated radio network to connect the same to the Interop Network 13. Thus, each IWS user (FIG. 5, User A and User B) intends to allocate an RNIC 20 under their control (e.g. RNIC A and RNIC B respectively) to participate in the incident. The operator of each IWS controller 22 then uses a GUI such as the GUI 120, shown in FIG. 7, to select an RNIC 20 (and associated radio network 12) allocated for the incident and for which the IWS controller 22 is authorized to control (FIG. 5, step 87). For example, the GUI 120 for Lowell (Lowell, Mass.) identifies an RNIC 20 for each of a Police F1-122; Police F2-124; Police TAC-5-126; Fire Primary-128; and Fire TAC-6-130. As indicated in the FIG. 7 example, the Lowell GUI 120 indicates only RNICs 20 for which the IWS controller 22 is authorized to control. Thus, the RNICs associated with other agencies do not appear on the GUI 120 of the IWS controllers 22 associated with the Lowell agencies.

As set forth above, each incident 72 created includes a separate IP address designated for that incident. Thus, if multiple incidents occur simultaneously wherein the same organizations are invited to couple their resources to the Interop Network 13, the audio transmissions are communicated to the radio networks 12 via the separate IP addresses for each incident 72. Accordingly the endpoint group for one incident 72 may include some common resources such as the IWS controllers 22 as well as various different or common RNICs 20 and associated radio networks 12.

As further shown in FIG. 5, the incident controller 45 for each IWS controller 22 then looks up and retrieves the IP address of the RNIC 20 to be coupled to the Interop Network 13 in the endpoint registry 64. The IWS controller 22 and/or incident controller 45 (FIG. 5, IWS A and IWS B) then sends an invitation to the retrieved address of the RNIC 20 using the Interop Network 13. (FIG. 5, step 89). As set forth above, the preferred embodiment uses the standard SIP protocol with message encryption. The incident controller 45 on the designated RNIC 20 receives the invitation and verifies (via the public keys stored in the configuration database 66) that the invitation is from an IWS controller 22 that has permission to control that RNIC. If verified, the RNIC 20 accepts the invitation, which causes the incident controller to send an acceptance message to the inviting IWS controller. (FIG. 5, step 91). The user of the IWS controller is notified of the acceptance by the RNIC 20 at step 93.

To complete the coupling of the allocated radio network 12 to the Interop Network 13, the incident controller 45 on the RNIC 20 directs the audio processor 60 to start a bidirectional audio stream as follows: Audio input from the connected resource (i.e., radio network 12) is converted to data packets (the preferred embodiment uses standard RTP or SRTP as appropriate) and is transmitted to the IP address assigned to the incident 72. This transmission may optionally be gated by either an "audio present" control signal from the resource, or by the audio processor 60 detecting that a sufficient audio signal is present. Data packets received on the assigned IP address are converted to audio and sent to the connected resource i.e., radio network 12 and thereby the associated communication devices 14). While such audio is being sent, the RNIC 20 will output an "audio present" control signal for use by the radio network 12. Still referring to the FIG. 5 example, all four endpoints (IWS A, IWS B, RNIC A, RNIC B) are thereby engaged in a full-duplex voice conversation which is established by joining the same in an IP multicast group (FIG. 5, event 95). Thus, any audio sent by one of the endpoints is received by all of the other endpoints.

Referring again to FIG. 6, the GUI 70 displays an activity log 82 including displaying a chronological listing 84 of the communications of each communications device 14 coupled to the incident 72. Additionally, a message window 86 on GUI 70 displays text messages conveyed between IWS controllers 22 associated with an incident 72. The message window 86 implements a text-messaging (or instant messaging) capability between the IWS controllers 22 participating in an incident 72. Operators of the IWS controllers 22 enter a message in the bottom window 135 then click the send button 137; The message is then sent to all other IWS controllers 22 which are currently members of the incident 72 and appears in the message window 86 of each of these IWS controllers. As shown in FIG. 6, identification headings as to the source of the messages are appended to the displayed listing 84 and the transcriptions 90 to identify the source of the transmission. This is one example of how the Interop System 10 provides more than just voice interoperability between discrete systems.

Still referring to FIG. 6, the GUI 70 also includes a member listing 92 for each incident 72 that identifies each organization or radio network 12 which have authorized coupling its associated radio network to the Interop Network 13 for the particular incident. Thus, the IWS controller 22 has a visual display showing all organizations and associated radio networks 12 coupled to the Interop Network 13 for each incident.

At any time during or following the completion of an incident 72, an IWS controller 22 via a user thereof may terminate the coupling between an associated radio network 12 for which the IWS controller is authorized to control and the Interop Network 13.

Accordingly, each IWS controller 22 communicates with other IWS controllers and RNIC 20 servers as peer-to-peer nodes in the Interop Network 13. Additionally, each RNIC 20 operates in response to commands from an authorized IWS controller. Incident communications are transmitted to all IWS controllers 22 and RNIC 20 servers coupled to an incident 72 using peer-to-peer multicast transmissions. Accordingly, each RNIC 20 and associated radio network 12 is coupled to the Interop Network 13 pursuant to commands from an authorized IWS controller 22. Thus, control of each radio network 12 is maintained by an IWS controller 22 associated therewith.

Although, the above-identified embodiment of the invention illustrates a system and method for coupling a plurality of radio networks 12 to the Interop Network 13, the present invention is not limited in this regard as other types of communications systems and networks can also be coupled to an Interop Network 13 in accordance with the present invention. For example, a public address system (e.g., the public address system in a high school or college campus) can be coupled to the Interop Network 13 via an RNIC 20 server and appropriate interface such that agencies such as police or fire organizations can directly operate and communicate over the public address system via the Interop Network 13. Thus, any type of discrete communications system can be coupled to the Interop System in accordance with the present invention via an RNIC 20 and appropriate interface.

Further, it is not required that the RNIC 20 and IWS controller 22 reside on separate servers, thus the Interop system 10 disclosed can be integrated directly into dispatch consoles present in an existing system. Alternatively, the interop system disclosed can be integrated directly into a computer-aided dispatch (CAD) system.

Additionally, the Interop system of the present invention can be used to permit discrete organizations, and the computer networks associated therewith, to be accessible to otherwise disjunct agencies or networks. For example, the present invention Interop System 10 can be utilized to provide police unit field units access to data facilities residing on a database coupled to an otherwise disjunct network, such as a crime database or floor plan of a building. Thus, the disclosed system can be used to selectively grant access to data sources, such as a database.

Another example of resources which are connectable to an Interop System of the present invention are video systems including video cameras, such as surveillance or in-vehicle cameras wherein access to the video data captured thereby is selectively provided to other users of the Interop system.

As set forth above, many other types of communications devices can be coupled to an Interop System in accordance with the present invention wherein selective access to certain resources is provided to other organizations and users thereof coupled to the system. Access is granted and controlled only by authorized controllers associated with the resources.

Further, a pre-planned ("storm plan") can be developed to facilitate rapid setup of an incident configuration in accordance with the present invention system. Also, the disclosed system can provide communications among a defined subset of members (such as certain IWS controllers only, permitting dispatchers to "conference" off-the-air with respect to an incident group).

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A method for establishing an incident communications network that enables interoperable communications among communications resources controlled by multiple organizations during an incident involving emergency or pre-planned multi-organization communications, wherein an administrator controls a set of communications resources within an organization, comprising:

upon an occurrence of an incident, establishing an incident identifier associated with the incident;

establishing communications among communications resources controlled by administrators that accept an invitation to be electronically coupled to the incident communications network, wherein communications among administrators and communications resources are exchanged on one or more communications channels associated with the incident identifier; and granting communication rights to communications resources, wherein the rights granted for a communications resource are determined by an administrator that controls the communications resource, wherein an administrator retains control of communications resources that were under the control of the administrator prior to the start of the incident, wherein control is the ability to determine the capabilities of the communications resource that are made available to other organizations within the incident communications network.

2. The method of claim 1, wherein an administrator is a user or electronic controller.

3. The method of claim 1, wherein the communications resources comprise communications devices, communications facilities, or data resources.

4. The method of claim 3, wherein communications devices include two-way radio communications devices, push-to-talk devices, wireline telephones, wireless telephones, personal digital assistants (PDAs), smartphones, public address systems, group address systems, video cameras or surveillance devices.

5. The method of claim 3, wherein the incident communications network includes audio and video communications devices.

6. The method of claim 1, further comprising storing an identity of a communications resource that accepts an invitation to participate in the incident communications network within a registry.

7. The method of claim 1, further comprising transmitting a control message to an interface controller associated with a communications resource that couples the communications resource to the incident communications network.

8. The method of claim 7, wherein the control message is encrypted.

9. The method of claim 1, further comprising assigning a unique transport address to enable routing of communications or data within the incident communications network.

10. The method of claim 1, further comprising establishing multiple incident communications networks, wherein communications resources are contained within more than one incident communications networks simultaneously.

11. The method of claim 1, further comprising identifying unique groupings of organizations and associated communications resources that are capable of participating within the incident communications network.

12. The method of claim 1, further comprising identifying communications resources to be invited to the incident communications network based on incident conditions.

13. The method of claim 12, wherein communications resources to be invited are included within a pre-existing plan.

14. The method of claim 1, further comprising determining communications resources to be invited to participate in the incident communications network based on a pre-existing plan.

15. The method of claim 1, further comprising maintaining pre-existing plans to facilitate establishment of the incident communications network.

16. The method of claim 1, further comprising defining a subset of administrators to selectively communicate among the subset.

17. A server having stored thereon computer executable instructions, execution of which by a processing device causes the processing device to perform operations for establishing an incident communications network that enables interoperable communications among communications resources controlled by multiple organizations during an incident involving emergency or pre-planned multi-organization communications, wherein an administrator controls a set of communications resources within an organization, the operations comprising:

upon an occurrence of an incident, establishing an incident identifier associated with the incident;

establishing communications among communications resources controlled by administrators that accept an invitation to be electronically coupled to the incident communications network, wherein communications among administrators and communications resources are exchanged on one or more communications channels associated with the incident identifier; and granting communication rights to communications resources, wherein the rights granted for a communications resource are determined by an administrator that controls the communications resource, wherein an administrator retains control of communications resources that were under the control of the administrator prior to the start of the incident, wherein control is the ability to determine the capabilities of the communications resource that are made available to other organizations within the incident communications network.

18. The server of claim 17, wherein an administrator is a user or electronic controller.

19. The server of claim 17, wherein the communications resources comprise communications devices, communications facilities, or data resources.

20. The server of claim 19, wherein communications devices include two-way radio communications devices, push-to-talk devices, wireline telephones, wireless telephones, personal digital assistants (PDAs), smartphones, public address systems, group address systems, video cameras or surveillance devices.

21. The server of claim 17 having stored thereon computer executable instructions, execution of which by a processing device causes the processing device to perform operations, the operations further comprising storing an identity of a communications resource that accepts an invitation to participate in the incident communications network within a registry.

22. The server of claim 17 having stored thereon computer executable instructions, execution of which by a processing device causes the processing device to perform operations, the operations further comprising assigning a unique transport address to enable routing of communications or data within the incident communications network.

23. The server of claim 17 having stored thereon computer executable instructions, execution of which by a processing device causes the processing device to perform operations, the operations further comprising establishing multiple incident communications networks, wherein communications resources are contained within more than one incident communications networks simultaneously.

24. The server of claim 17 having stored thereon computer executable instructions, execution of which by a processing device causes the processing device to perform operations, the operations further comprising identifying unique groupings of organizations and associated communications resources that are capable of participating within the incident communications network.

25. The server of claim 17 having stored thereon computer executable instructions, execution of which by a processing device causes the processing device to perform operations, the operations further comprising identifying communications resources to be invited to the incident communications network based on incident conditions.

26. The server of claim 25, wherein communications resources to be invited are included within a pre-existing plan.

27. The server of claim 17 having stored thereon computer executable instructions, execution of which by a processing device causes the processing device to perform operations, the operations further comprising determining communications resources to be invited to participate in the incident communications network based on a pre-existing plan.

28. The server of claim 17 having stored thereon computer executable instructions, execution of which by a processing device causes the processing device to perform operations, the operations further comprising maintaining pre-existing plans to facilitate establishment of the incident communications network.

29. The server of claim 17 having stored thereon computer executable instructions, execution of which by a processing device causes the processing device to perform operations, the operations further comprising defining a subset of administrators to selectively communicate among the subset

* * * * *

UNITED STATES PATENT AND TRADEMARK OFFICE
CERTIFICATE OF CORRECTION

PATENT NO. : 8,320,874 B2  
APPLICATION NO. : 12/651794  
DATED : November 27, 2012  
INVENTOR(S) : Mills et al.

Page 1 of 1

It is certified that error appears in the above-identified patent and that said Letters Patent is hereby corrected as shown below:

Column 12  
Line 55, Claim 29, please replace "subset" with --subset.--

Signed and Sealed this  
Twenty-sixth Day of February, 2013

Teresa Stanek Rea  
*Acting Director of the United States Patent and Trademark Office*